United States Patent [19]

Riddel

[11] 3,890,478

[45] June 17, 1975

[54] LIQUID LEVEL SENSOR

[75] Inventor: John W. Riddel, Fenton, Mich.

[73] Assignee: General Motors Corporation, Detroit, Mich.

[22] Filed: Nov. 7, 1973

[21] Appl. No.: 413,448

[52] U.S. Cl. ............... 200/84 R; 73/308; 340/244 B
[51] Int. Cl. .......................................... H01h 35/18
[58] Field of Search .. 200/84 R, 84 B, 84 C, 153 K; 340/244 B; 73/308, 317, 319, 313, 321

[56] References Cited
UNITED STATES PATENTS

| 1,985,659 | 12/1934 | Hickstein | 200/84 B |
| 2,596,666 | 5/1952 | Edgar et al. | 200/84 R |
| 2,613,294 | 10/1952 | McNea | 200/84 R |
| 2,683,783 | 7/1954 | Palladino, Jr. | 200/84 R |
| 2,744,177 | 5/1956 | Barber | 200/84 R |
| 2,781,432 | 2/1957 | Ferrara et al. | 200/84 R |
| 3,211,853 | 10/1965 | Corvoisier | 200/84 R |

Primary Examiner—David Smith, Jr.
Attorney, Agent, or Firm—K. H. MacLean, Jr.

[57] ABSTRACT

A liquid level sensor for a tank having a base member supporting a terminal member insulated therefrom and an arm with float attached at one end which is movable in response to changes in the liquid level of the tank to cause the arm's other end to operably engage the terminal member to complete an electrical warning circuit. A coil type spring normally supports the arm in a neutral position which corresponds to a full tank. When the liquid level decreases, the coil spring is deflected to allow the arm to establish a connection between the terminal and the base of the sensor which is grounded.

2 Claims, 6 Drawing Figures

LIQUID LEVEL SENSOR

This invention relates to liquid level sensors for tanks.

The subject liquid level sensor is an economical, compact and rugged assembly particularly adapted for use in automobiles to sense the liquid level in tanks such as radiators or brake reservoirs. The sensor may be adapted for mounting upon a horizontal or a vertical surface of a tank and includes a base member which supports a terminal by means of an insulating member. An arm extends into the tank interior from the base and has a float attached at one end which is movable with changes in the liquid level. The other end of the arm operably engages spring means to normally maintain the arm in a neutral position. In this position the terminal does not contact the base. A decrease in the liquid level causes the spring to deflect so as to establish a connection between the terminal and the base, thus completing a warning circuit.

The subject sensor is easily assembled and has few parts. The only movable portions of the sensor are the float and arm assembly and its spring support. The use of a spring support further contributes to the ease of assembly and the ruggedness of the sensor. Also, the spring can be manufactured in large quantities having surprisingly uniform characteristics which contribute to the sensor's usefulness by eliminating the need for calibration means.

An advantage of the subject liquid level sensor is its ruggedness which guards it from damage normally caused by rough handling during assembly, transportation or installation in the tank. The coil spring which supports the arm and float assembly is sufficiently resilient to absorb shocks.

The coil spring support is also less subject to being "plugged or blocked up" by foreign matter than other more delicate mechanisms which are known. In addition, the coil spring support is better able to withstand the damage caused by corrosive materials than more intricate mechanisms. If desired, the liquid sensor can be utilized with a diaphragm to separate the liquid in the tank from the spring mechanism of the sensing unit which further increases the durability of the sensor, particularly when used in a corrosive liquid.

An object of the present invention is to provide a liquid level sensor of rugged construction utilizing a spring means to support a movable member adapted to follow changes in liquid level within a tank.

Another object of the present invention is to provide an economical and durable sender having a coil spring support for a liquid level responsive sensing arm and float assembly which normally maintains the arm in a neutral position out of electrical contact with a terminal member.

Further objects and advantages of the present invention will be more readily apparent, reference being had to the accompanying drawings in which the preferred embodiments are illustrated.

IN THE DRAWINGS

Figure 1:
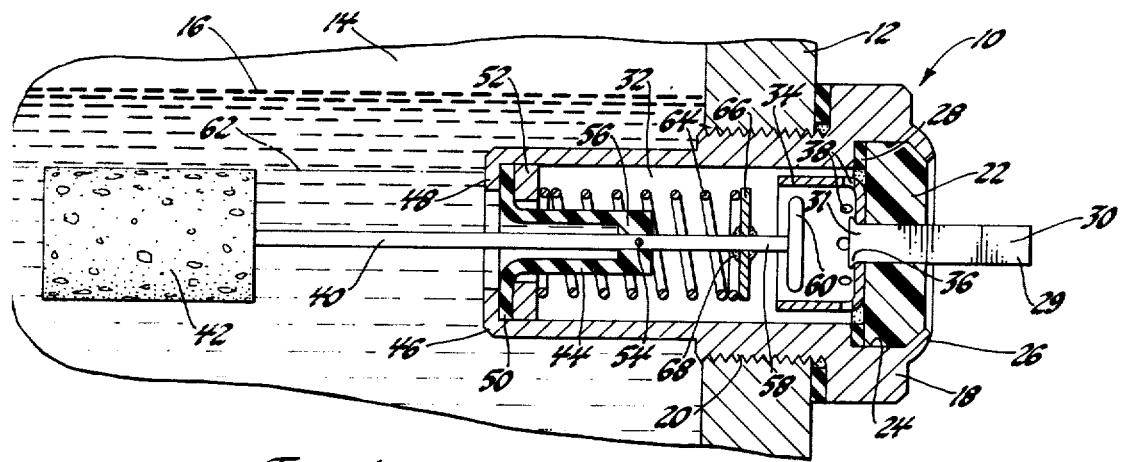
FIG. 1 is an elevational sectioned view of one embodiment of the subject invention adapted for mounting in a vertical tank wall.

In FIG. 1, a liquid level sensor 10 is illustrated threadably mounted within a vertical wall 12 of a tank. The interior 14 of tank 12 is adapted to hold a predetermined quantity of liquid having a normal level 16. The sensor 10 includes a base member 18 having a threaded portion 20 adapted to engage similar threads in a bore through the wall 12. Base 18 supports an insulating washer member 22 mounted within a recess 24. The shoulder 26 surrounding recess 24 is crimped or spun over the washer 22 to retain it within recess 24. A gasket 28 is located between washer member 22 and the base member 18 to prevent leakage of fluid therebetween.

Insulating washer 22 supports a terminal means 30 having an exterior portion 29 and an interior portion 31 which is in the interior 32 of sensor 10. Terminal means 30 includes a cup-shaped contact 34 supported by the enlarged end 36 of terminal 30 which holds it against the interior surface of the washer 22. A plurality of holes 38 in the cup-shaped contact 34 permits the escape of air which may be trapped within the cup-shaped contact during assembly or filling of tank 14.

An arm member 40 extends from the sensor 10 into the interior 14 of the tank and has a float member 42 attached to one end. The float member 42 is of a material having substantially the same density as the liquid (usually oil or water) in the tank and thus when submerged has little or no weight. Arm 40 extends through a diaphragm member 44 which is mounted within the ends 46 of the base member 18. Specifically, the diaphragm is retained by a spun-over portion 48 of base member 18 which presses edge 50 of diaphragm 44 against a member 52. The arm 40 is pivoted near its midportion by a pin 54 which extends through the central portion 56 of diaphragm 44. By pivoting the arm 40 at substantially the same location on the arm that contacts diaphragm 44, any restraining force caused by the resistance to movement of the diaphragm is minimized. The use of diaphragm 44 prevents a corrosive liquid in tank 12 from damaging the interior portion of the sensor. The space 32 enclosed by diaphragm 44 may be filled with an incompressive, non-conducting liquid to minimize distention of the diaphragm in a pressurized system.

The end 58 of arm 40 to the right in FIG. 1 supports a disc-shaped contact button 60 which is movable with end 58 about pivot pin 54 as the float 42 moves downward with decreasing liquid levels below the level indicated by broken line 62. As the level falls below line 62, the float 42 moves downward, pivoting button contact 60 upward in FIG. 1 until electrical contact is made between the button 60 and the cup-shaped contact 34. This completes a warning circuit from terminal 30 to the base member 18 through the arm 40 and energizes an indicator (not shown).

Normally, float 42 assumes the position shown in FIG. 1 due to its near zero weight within liquid 16. A coil type spring 64 encircles the arm 40 and extends from member 52 to a member 66 which is attached to arm 40 by a solder or brazed connection 68. The normal unstressed axial orientation of the coil spring 64 resists lateral deflections caused by pivotal movement of arm 40 about pin 54. However, when the effective weight of float 42 increases due to decreases in the liquid level below line 62, spring 64 is laterally deflected from its unstressed axial orientation in an upward direction as shown in FIG. 1 until button 60 engages the contact 34.

Figure 2:
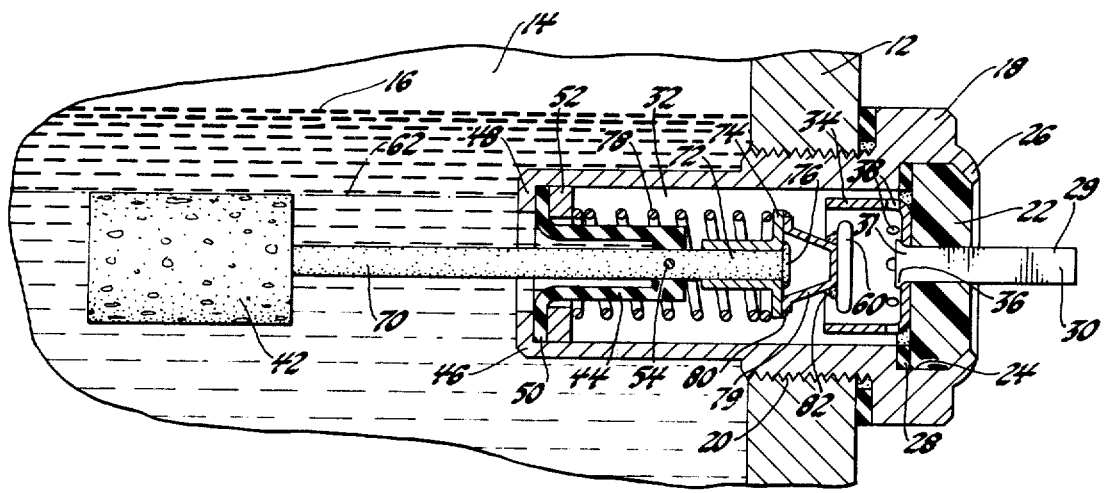
FIG. 2 is an elevational sectioned view of another embodiment of the invention similar to FIG. 1.

FIG. 2 illustrates an embodiment somewhat similar to FIG. 1 and therefore like portions are numbered the same. Specifically, one difference between the two embodiments is the use of a plastic float arm 70 which is pivoted about pin 54 and is made of a corrosion-resistant plastic. The end 72 of arm 70 nearest terminal 30 has a metal spring retainer 74 held thereon by a flattened end 76. Spring 78 extends between the retainers 52 and 74. A contact support member 79 is attached by soldering at 80 to the end of spring retainer 74. Button contact 60 is attached upon the end of the support member 79 by solder at 82.

In both of the embodiments shown in FIG. 1 and FIG. 2 the floats and arm assemblies are shown in a neutral position which is maintained whenever the liquid level is above level 62. Below level 62, the weight force of the float 42 on arms 40, 70 increases due to the decreasing level of liquid. This causes arms 40 and 70 to pivot about pin 54 and the button 60 to contact the cup-shaped contact 34 which completes a circuit through spring 64 to the base member 18.

Figure 3:
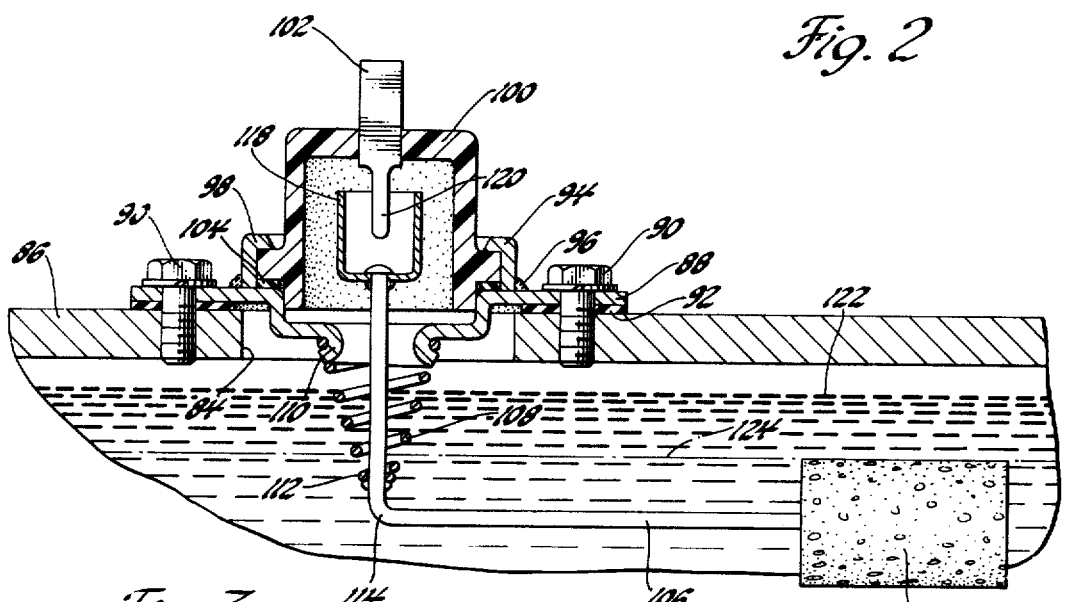
FIG. 3 is an elevational sectioned view of a still further embodiment of the invention adapted for mounting in a horizontal tank wall.

In FIG. 3 of the drawings, another embodiment of the sensor is illustrated which is adapted for mounting in a bore 84 in a horizontal wall 86. A sensor base member 88 is attached to the wall 86 by screws 90. A gasket 92 prevents leakage between member 88 and wall 86. A retaining ring 94 is attached to base 88 by a brazed or soldered joint 96. An inwardly turned lip portion 98 of ring 94 retains an insulating support member 100 in which is mounted terminal member 102. A gasket 104 between the member 100 and the member 88 prevents fluid leakage therebetween.

An arm 106 is supported by a helically shaped spring 108 whose upper end is attached to base 88 by portion 110. The lower end 112 of spring 108 encircles and engages the arm 106 which is bent at 114 into a horizontal portion having a float 116 attached to one end and a vertical portion with a cup-shaped contact 118 attached thereto. The contact member 118 surrounds a depending portion 120 of a terminal 102.

The float 116 is of the same or a similar material as previously described with a density very close to the liquid in tank 86 so that when the float 116 is completely covered by liquid at a level indicated by numeral 122, the weight of the float 116 is insignificant and the spring 108 is capable of centering portion 120 of terminal 102 within the contact 118. When the level of the liquid falls below the broken line 124 the weight of the exposed float 116 becomes more significant and this causes the end 112 of spring 108 to be deflected. Consequently, the cup-shaped member 118 moves to the right in FIG. 3 and eventually contact is made between terminal 102 and contact 118 which completes a warning circuit through spring 108 to the base member 88.

Figure 4:
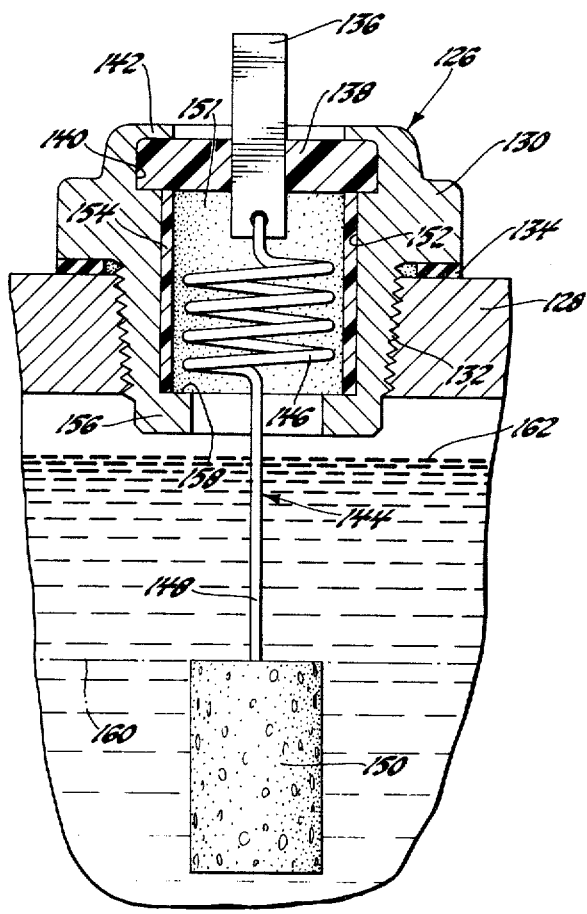
FIG. 4 is an elevational sectioned view of another embodiment of the subject invention adapted for mounting in a horizontal wall.

In FIG. 4, an embodiment of a sensor 126 is illustrated which is adapted to be mounted within a horizontal wall 128 of a tank. The sensor 126 includes a threaded base member 130 which engages threads in a bore 132. A gasket 134 between the base member 130 and the wall 128 prevents fluid leakage therebetween. A terminal member 136 is supported by an insulating washer member 138 retained within recess 140 in the base member 130. A spun-over portion 142 holds the member 138 within the recess 140. An integral coil spring and arm member 144 which has a spring portion 146 and an arm portion 148 is connected at an upper end to terminal 136. The arm portion 148 is attached to a float member 150 which has a density substantially equal to the liquid in tank 128.

The spring portion 146 is enclosed within a cylindrical chamber or recess 151 having a wall 152 in the base member 130. A sheet of insulating material 154 is placed between wall 152 and the spring 146 to preclude electrical contact therebetween. The lower end 156 of the base portion 130 extends radially inward and includes surface 158 adapted to engage the coil spring 146. This occurs when spring 146 is elongated by the force of the float 150 as the liquid level falls below the broken line indicated by the numeral 160. When this happens, an electrical contact is made between terminal 136 and the base 130 through the spring 146. Normally, however, liquid level such as indicated at 162 causes the float 150 to be substantially weightless and to maintain the coil spring 146 in its relaxed position.

Figure 5:
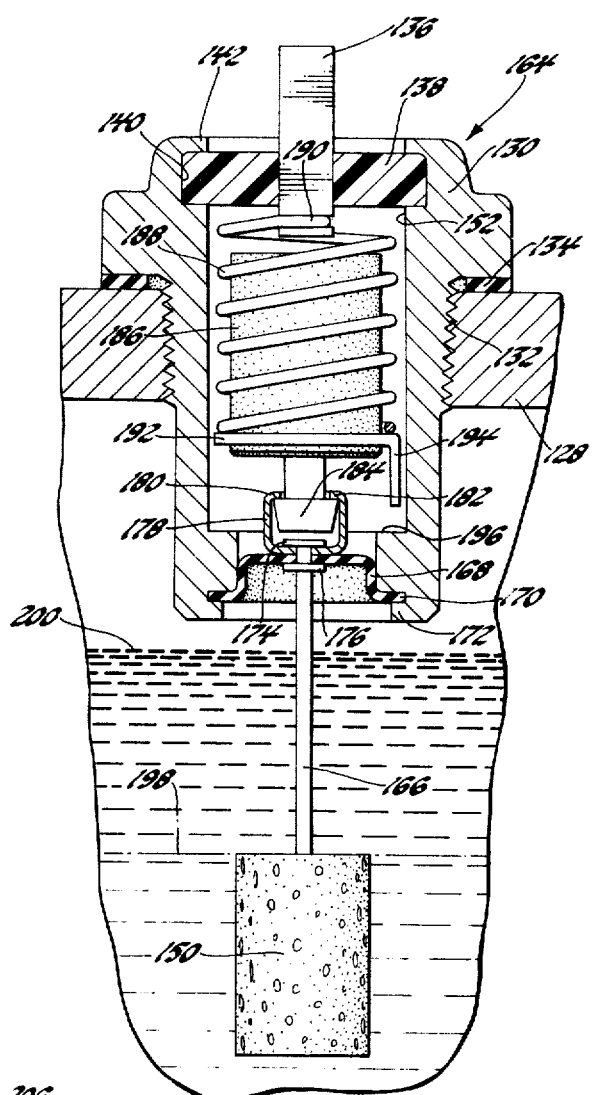
FIG. 5 is an elevational sectioned view of another embodiment similar to FIG. 4.

The embodiment of a sensor 164 shown in FIG. 5 is somewhat similar to that shown in FIG. 4 and many of its parts are numbered similarly. An arm 166 has float 150 attached to its lower end and is supported at its upper end by a diaphragm 168 whose outer edge 170 is retained by spun-over portion 172. Retainers 174 and 176 engage opposite sides of the central portion of the diaphragm 168. In addition, the retainer 174 secures a U-shaped snap coupler 178 to the diaphragm 168. The coupler 178 has oppositely located and inwardly directed portions 180 and 182 which engage an enlarged head portion 184 of a cylindrical insulator member 186. A coil spring 188 encircles the member 186 and is attached at its upper end 190 to terminal 136. The coil spring is attached to a contact 192 also around the insulator 186. The contact 192 has a depending arm 194 adapted to engage an inwardly extending portion 196 of the base 130 whenever the liquid level decreases below the broken line 198 which effectively increases the weight force of float 150. When the liquid level is at a higher level, such as at level 200 as shown in FIG. 5, the float is essentially weightless and coil spring 188 is in its relaxed position shown in the drawing with contact arm 194 spaced from the base member 130.

Figure 6:
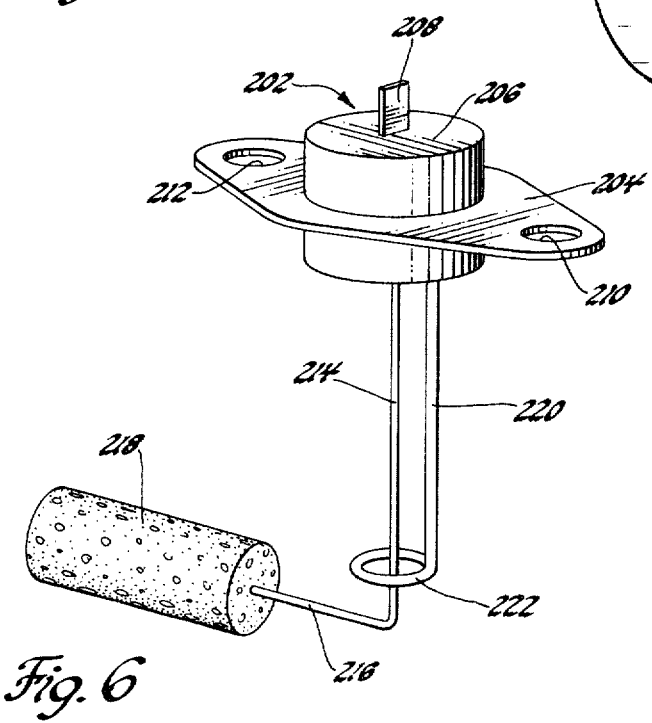
FIG. 6 is a perspective view of a still further embodiment of the present invention.

FIG. 6 illustrates a sensor 202 similar to the sensors shown in FIGS. 3 and 4. A base member 204 supports an insulated portion or washer 206 in which is mounted a terminal member 208. Holes 210, 212 in the base member 204 are adapted to attach the base member to a horizontal wall of a liquid-filled tank. An arm 214 extends downward from the base member 204 and includes a horizontal portion 216 on the end of which a float member 218 is attached. Arm 214 is electrically connected to the terminal 208. A contact member 220 extends from base 204 downward and terminates in a circular portion 222 encircling the vertical portion of arm 214. When the liquid level falls to a level uncovering float 218, its weight causes the arm 214 to pivot toward the contact member 220 until it contacts any portion of the loop portion 222. This completes a warning circuit from terminal 208 through arm 214 and circular contacts 220 to the base portion 204.

Although the embodiments illustrated and described above are preferred embodiments, other embodiments may be adapted without falling outside the scope of the following claims.

What is claimed is as follows:

1. A liquid level sensor for a fluid containing tank comprising: a base member adapted to be supported by a tank wall; an insulating member supported by said base; a terminal member extending through said insulating member and having a first end portion extending outside the tank wall and adapted to be connected to an external low level indicator and a second end portion on an opposite side of said insulating member; an arm extending from said base member into said tank interior; float means in said tank interior attached to one end of said arm to produce movements of said arm in response to changes in the liquid level in the tank; a coil spring with a first end attached to said base member and a second end within the tank and operably supporting said arm to provide a resilient connection between said base member and said arm whereby movement of said float means due to a predetermined drop in the liquid level causes said arm to laterally deflect the second end of said spring in one direction and thereby cause movement of the other end of said arm in a second opposite direction; cup-shaped contact means supported between the second end portion of said terminal member and the other end of said arm for making an electrical connection therebetween by contact with the inner cylindrical surface of the contact.

2. A liquid level sensor for a fluid containing tank comprising: a base member adapted to be supported by a tank wall; an insulating member supported by said base member; terminal means extending through said insulating member and having a first end portion extending outside the tank wall and adapted to be connected to an external low level indicator and a second end portion on an opposite side of said insulating member; an arm extending away from said base member into said tank interior; float means in the tank interior attached to one end of said arm to produce movements of said arm in response to changes in the liquid level in the tank; diaphragm means attached at a peripheral edge to said base member and engaging a mid-portion of said arm to provide a resilient connection between said base and said arm; a pin extending through said diaphragm means and said arm to permit pivotal movement thereabout; a coil spring with a first end attached to said base and a second end operably attached to the other end of said arm whereby movement of said float means due to a predetermined drop in the liquid level causes said arm to pivot around said pin and move the other end of said arm while laterally deflecting the second end of said spring; cup-shaped contact means supported between the second end portion of said terminal member and the other end of said arm for making an electrical connection between said terminal and said base by contact with the inner cylindrical surface of the contact.

* * * * *